Aug. 26, 1941.   S. T. WILLIAMS   2,253,544
PRESS FLUID CONTROL UNIT
Filed May 20, 1939   2 Sheets-Sheet 1

INVENTOR
Selden T. Williams
BY
Fraser, Myers & Manley
ATTORNEYS.

Aug. 26, 1941. S. T. WILLIAMS 2,253,544
PRESS FLUID CONTROL UNIT
Filed May 20, 1939  2 Sheets-Sheet 2

Patented Aug. 26, 1941

2,253,544

UNITED STATES PATENT OFFICE 2,253,544

PRESS FLUID CONTROL UNIT

Selden T. Williams, Bellerose, N. Y., assignor to Scovill Manufacturing Company, Waterbury, Conn., a corporation of Connecticut Application May 20, 1939, Serial No. 274,689

9 Claims. (Cl. 121—38)

My present invention relates to pneumatic fluid control devices for power presses and the like, and constitutes an improvement upon the pneumatic fluid control for presses disclosed in my co-pending application, Serial No. 243,220, filed November 30, 1938.

The prevention of injury to press operators of power presses has long received the attention of safety engineers and labor boards, and much has been done to reduce the hazard to personal injury incident to press operations. Various forms of safety appliances in the nature of safety clutches, electrical devices, and mechanical shields have been devised, and while these have met with varying degrees of success and recognition, on the whole they have been open to one objection or another. Among the primary objections met with by these safety devices are: (1) their tendency to slow down the press operation; (2) their high installation cost; (3) their non-foolproof character; and (4) their safety characteristics could be circumvented by an operator who desired to speed up production.

My present invention provides a safety device for power presses and the like which overcomes the various objections and limitations above mentioned. In its underlying concept my invention relies upon compressed air to operate a plunger for tripping a clutch on the drive shaft of the press or for operating an equivalent means, and a plurality of control valves so disposed with relation to the operating head of the press that both hands of an operator must be used to operate said valves and be well away from the danger zone when doing so; and further, said valves are shielded so that they can not be accidentally operated.

With the safety device described in my co-pending application referred to, it has been found that if the normal operating conditions should vary, so that the air pressure suddenly falls, the puff of air which is admitted to the trip plunger operating cylinder is not always sufficient to insure the tripping action. Hence, according to my present invention I rely upon a continuously acting pressure to operate the trip plunger and I provide a normally spring-seated pilot valve adapted to be unseated by a pilot-operating means, which, in turn, can be operated by a puff of compressed air at much lower pressure than is necessary to operate the plunger for tripping a clutch. I also rely upon the movement of the piston in the clutch-operating cylinder to release the pilot-operating means whereby to permit the pilot valve to shut off the supply of air pressure to the operating cylinder, and, in turn, vent the compressed air from the operating cylinder to the atmosphere.

The principle, construction and operation of my improved safety control device will be better understood from the detailed description which follows, when considered in connection with the accompanying drawings which show a practical embodiment of my invention, and wherein:

Fig. 4 is a longitudinal section through the clutch-operating cylinder, the pilot valve and the pilot operating means forming an essential part of my present invention.

Fig. 5 is a top plan view of the parts shown in Fig. 4.

Figure 1:
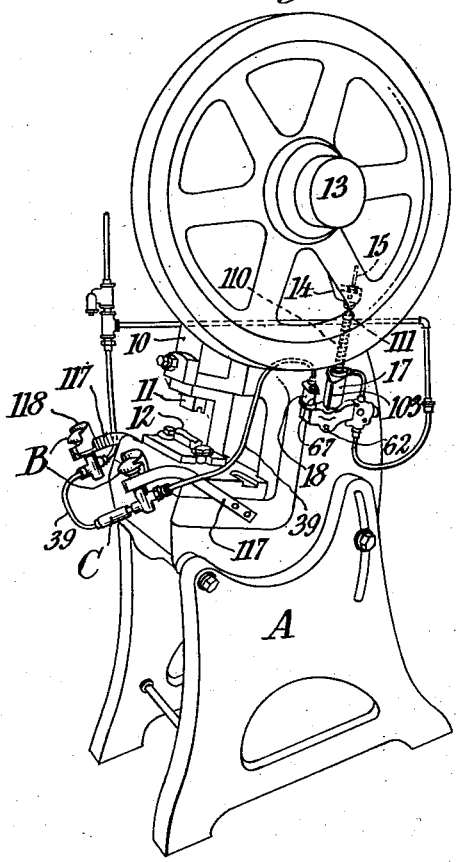
Figure 1 is a perspective view of a power press showing my invention applied thereto.
Figure 2:
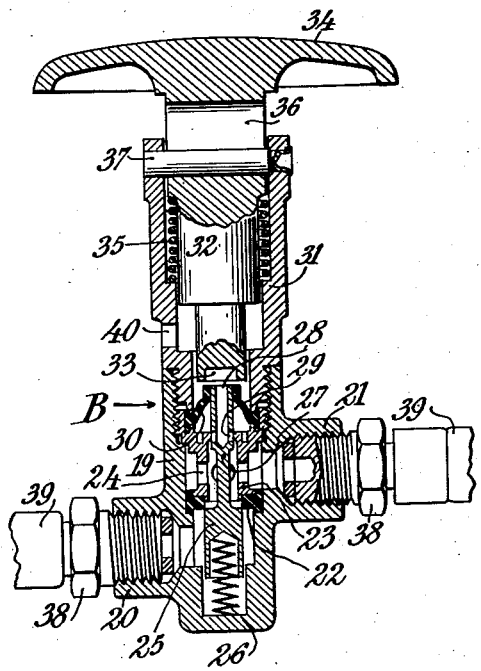
Fig. 2 is a longitudinal section through one of the manually operable valves forming a part of my invention.

Although my invention is capable of use with any type of press or machine which has a movable head adapted to move toward and away from a complemental member and between which members the hands of an operator must be positioned in the handling of the work to be operated upon by the machine, I have shown my safety device applied to a power press A of conventional design having a movable head 10 which carries a die 11 for cooperation with a complemental die 12 mounted on the base of the press. The head 10 is reciprocable so as to bring the dies 11 and 12 into operative position to the work being acted upon, and reciprocation of the head being provided by rotation of a shaft 13 upon which is mounted a positively-acting clutch (not shown) of any approved type. As contemplated by my present invention, the clutch is adapted to be tripped by a clutch trip arm 14 carried by a rod 15, one end of which carries a piston 16 mounted in a clutch-operating cylinder 17.

For operating the clutch trip arm only when the hands of the operator are well away from danger, I have provided a pair of manually operable valves B and a cut-out valve C which form part of a pneumatic circuit adapted to supply a puff of compressed air into a cylinder 18 of a pilot valve operating means D for unseating a pilot valve E to admit compressed air from a source directly into the clutch-operating cylinder 17.

The manually operable valves B are identical in construction and each consists of a hollow casing 19 having lateral tubular offsets or projections 20 and 21 providing induct and educt openings, respectively, in the casing. Within the casing between the lateral offsets is a shoulder upon which is mounted a valve packing seat 22 which is held in place by a tubular plug 23 having lateral openings 24 therein, the said plug being screw-threadedly or otherwise held in position within the casing. Mounted within the casing for engagement with the packing seat 22 is a valve check member 25, the lower portion of which is hollowed out and encloses a helical spring 26 for normally holding the valve against its seat. The valve check 25 above the seating portion thereof is formed with an axial pin 27, the upper end 28 of which is of tubular form and of a diameter to snugly slide through the axial opening in the tubular plug 23, and said tubular portion of the pin at its lower end is formed with lateral openings 29. To insure against leakage and to provide an air seal between the top of the tubular plug 23 and the top of the hollow portion 28 of the valve pin 27 I connect said parts together by a cone-shaped packing 30. Any suitable means may be employed for holding this packing in contact with said parts, and as herein shown, the packing which is formed as a separate part, has a sliding fit with the hollow portion of the valve check pin and is held in clamping engagement with the tubular plug 23 by a tubular member 31 which screw-threadedly engages within the casing 19. Mounted for telescopic movement within the tubular member 31 is a plunger 32, the inner end of which is recessed, as at 33, to engage over and seal the open end of the hollow portion of the valve check pin when the plunger is depressed in the act of unseating the valve check 25. The plunger 32 is of a length to extend beyond the top of the tubular member 31 and is normally urged outwardly by a helical spring 35 mounted between a shoulder within the tubular member 31 and a shoulder on the plunger 32 for limiting the extent of the plunger movement. For holding the plunger 32 against separation from the tubular member 31, the plunger is formed with a slot 36 through which extends a pin 37 carried by the tubular member. For facilitating movement of the plunger by the hand of an operator, the plunger at its outer end is provided with an enlarged mushroom head 34. The tubular lateral offsets 20 and 21 are each threaded for connection with screw-threaded nipples 38 attached to sections of hose or flexible conduits 39 forming a part of the pneumatic circuit. The tubular member 31 is also formed with a lateral opening or vent 40, which, it will be observed, provides open communication through the tubular portion 28 of the valve check pin and the lateral openings 24 in the tubular plug 23, with the bore through the lateral offset 21, when the check valve 25 is seated. When the valve check 25 is unseated it will be apparent that this open communication is cut off by the seal provided by the engagement of the lower end of the plunger 32 with the coned packing 30.

The cut-out valve C consists of a casing formed of a central, substantially cylindrical element 41, the ends of which are screw-threadedly connected to tubular end members 42 and 43, each of which terminates in an outwardly-directed nipple 44 to which an end of the conduit or house 39 is suitably connected. Mounted within the casing provided by the elements 41, 42 and 43, is a tubular member 45 having a bore substantially flush with the bore through the nipple end of the element 42 and having an outwardly-directed flange 46 which is clamped against a flat surface in the element 42 by the screw-threaded connection between said elements 41 and 42. Surrounding the tubular element 43 in slightly spaced relation thereto is a tubular plunger check valve 47, which, at its end adjacent the flange 46, is formed with a flange 48 and carries a piston packing 49 having a diameter to air-tightly move within the cylindrical bore of the element 41.

Figure 3:
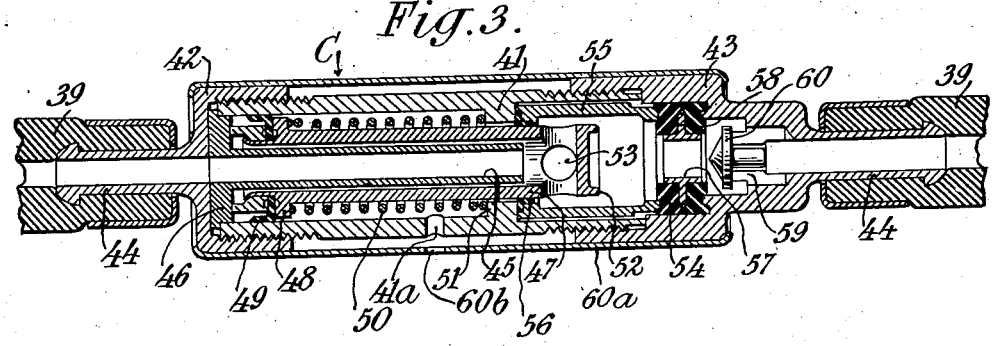
Fig. 3 is an axial section through a cut-out valve forming a part of my invention.

Surrounding the plunger check valve 47 and bearing at one end against the flange 48 is a helical spring 50, the opposite end of which bears against an inwardly-directed flange 51 on the tubular element 41 for the purpose of exerting a force upon the plunger valve for normally holding it in its unseated position, as shown in Fig. 3. The plunger valve 47 at its other end is closed and formed with an annular ring 52, rearwardly of which the plunger valve is formed with lateral openings 53 leading from the interior of the tubular plunger to the duct through the cut-out valve. The closed end of the plunger valve is adapted to engage a valve seat packing 54 mounted within the tubular element 43 and held therein by a sleeve 55 which is clamped between the annular flange 51 and said packing in the assembly of the elements 41 and 43, there being also provided a packing 56 between the sleeve 55 and the flange 51, which packing engages the outer wall of the plunger valve 47 to provide an air-tight seal therewith. The packing 54 consists of two washers which are pressed over a tubular sleeve 57 having an outwardly-directed flange or rib 58 intermediate its ends. The element 43 between the nipple 44 thereon and the packing 54 therein is formed with a chamber having a spider 59 for guiding the stem of a valve 60, the face thereof which engages the packing 54 being of conical form and of smaller effective area than the opposite face of said valve. The function for this construction will presently be explained. To prevent tampering with the cut-out valve parts they are housed within a shell 60a having a vent opening 60b. The tubular element 41 also has a vent opening 41a for permitting the venting of any air under pressure which may find its way into said element.

The pilot valve operating mechanism D, the pilot valve E, and the clutch-operating cylinder 17 are all supported upon a base plate or casting 61 which is pivotally mounted to the press frame at 62. The base plate or casting 61 is of such form as to constitute one head 63 of the pilot cylinder 18, one head 64 of the piston-operating cylinder 17, and the housing and support 65 for the pilot valve E.

The pilot cylinder 18 has a top closure head 66 of larger area than the cylinder 18 and is clamped in air-tight engagement therewith through suitable bolts 67, said head having an induct passage 68 in open communication with the pneumatic circuit which includes the valves B, the cut-out valve C and the conduit sections 39. Within the pilot cylinder 18 is a piston plunger 69 carrying a piston packing 70, the piston having axial extensions 71 and 72 on either side thereof, respectively. Encircling the piston extension 72 is a coil spring 73 which bears at one end against the cylinder head 63, and at its opposite end against the piston 69, and normally acts to urge said piston upwardly, and is limited in this action by engagement of the extension 71 with the head 66. The head 63 has an axial opening 74 therein through which the piston extension 72 may pass when the piston is subjected to air pressure. The free end portion of the extension 72 is of reduced diameter and provides a shoulder which serves to limit the extent of the downward movement of the piston within the cylinder.

Mounted within the base plate or casting 61 below the head 63 is a bell-crank lever 75 having arms 76 and 77 and being pivoted substantially at the intersection of said arms at 78. The arm 77 at its free end is bifurcated and has pivotally mounted thereto a trip bar 79, one end 80 of which extends below and in substantially parallel relation to the arm 76, and the portion of the trip bar to the opposite side of the pivot extends below and across the axis of the cylinder head 64. Mounted between the arms 76 and 80 is a compression spring 81 which normally tends to urge said arms apart into their normal position, as shown in Fig. 4.

The housing or body 65 of the pilot valve E is formed with various openings and passages therein, one of which, 82, is internally screw-threaded and accommodates a screw nut 83 which has an axial passage therethrough, and at its inner end is provided with an external shoulder which supports a packing gasket 84 which constitutes the seat for a valve check 85, the stem 86 of which slidably extends through the axial opening in the screw nut. The screw nut 83 adjacent the packing gasket 84 is formed with a transverse passage or duct 87, the function for which will presently appear. The valve check stem 86 immediately adjacent the valve check proper is of reduced diameter and the stem proper is hollowed out, as indicated at 88. At its outermost end the valve check stem is formed with a valve seat against which a ball valve 89 is adapted to seat. Inwardly from the ball valve seat, the valve stem is formed with a plurality of lateral openings 90 for establishing communication between the bore of the valve stem and the outer atmosphere. The valve stem 86 also has a transverse passage 90a at the inner end of the bore for establishing communication between the bore in the stem and the axial passage through the screw nut 83. For guiding the valve stem and for insuring a leak-tight sliding fit between it and the bore through the nut 83, the latter is provided with a packing washer 91 and a lock screw 92. The valve check 85 at its innermost end is formed with an axial projection 93 for supporting a coil spring 94 which normally serves to hold the check valve upon its seat. The pilot valve housing 65 is also formed with an internal chamber 95 in open communication with the passage through an adapter nipple 96, to which is connected a conduit 97 leading from a source of compressed air. The housing 65 is also formed with a chamber 98 which is in open communication with an adapter nipple 99 to which is secured a tube or conduit 100, the opposite end of which is connected through a suitable nipple adapter 101 with the interior of the cylinder 17 through suitable openings in the head or cover plate 102. The cover plate suitably holds the cylinder in leak-tight engagement with the head 64 by suitable bolts 103. The housing 65 is supported in the base plate or casting 61 through the medium of bolts 104, and is definitely located within said base plate by adjustment of a locating bolt 105 extending through a bracket 105a secured to said base plate, the head of the bolt 105 bearing against the housing 65 and being held in said position by a lock nut. Also carried by the housing 65 in a bifurcated lug thereon, is a lever 106 which is pivoted at 107 for limited movement, the free end of said lever being disposed between one end of the trip bar 79 and the ball valve 89, the said lever 106 being limited in its pivoted action and serving to hold the ball valve from dropping out of the valve stem, while at the same time permitting the unseating of said ball valve.

The cylinder head 102 has an axial passage therethrough within which is mounted a gland packing 108 for insuring against air leakage from the cylinder around the plunger rod 15. The gland packing is held in place by a screw-threaded plug 109 which also serves as a bearing for one end of a compression spring 110 mounted on the rod 15, the other end of the spring bearing against a collar 111 which is adapted to be held in fixed position on the rod 15.

The piston 16 consists of a disk-like member having a flat top face upon which is mounted a suitable packing cup 112 adapted for sliding leak-tight engagement with the inner wall of the cylinder 17, the said cup being held on the disk by a clamping plate 113, and a clamping nut 114 which screw-threadedly engages over an axial tubular bushing 115 on the piston disk. The tubular bushing also extends downwardly beyond the opposite side of the disk and constitutes a projection which is adapted to pass through an axial opening 116 in the piston head 64 to engage the trip bar 79 to release the lever 106 and permit the valve check 85 to seat under the tension of the spring 94.

The manually operable valves B may be conveniently attached to the machine by means of brackets 117 which are bolted to the ends of the bed of the press. These brackets may also conveniently carry shields 118 which extend above and partially encircle the mushroom heads 34 of the valves B.

The device hereinbefore described is primarily intended for operation in connection with repeating type clutches to insure but a single operation of the press.

*Operation.*—With the parts assembled and adjusted so that the admission of compressed air into the cylinder 17 will move the plunger 16 inwardly against the tension of the spring 110 and trip the clutch so as to permit the press head 10 to move downwardly, the operation of the device for press control is as follows:

The right hand operating valve B must be pressed down slightly in advance of the left hand valve B or substantially simultaneously therewith. When this is done, compressed air from the source passes through the pneumatic circuit into the cylinder 18 of the pilot valve operating means and forces the piston therein downwardly, which action causes a rocking of the bell-crank 75 against the tension of spring 81 and moves the trip bar 79 to the right, thereby moving the lever 106 against the ball valve 89 to force the valve check 85 off its seat. When the valve check 85 is unseated, compressed air enters into the chamber 95, thence between the open valve check and its seat and through the ducts or passages 87 into the chamber 98, and from there through the conduit 100 into the cylinder 17 to force the piston 16 downwardly, which action trips the clutch and permits the head of the press to move downwardly. As the piston 16 approaches the bottom of the cylinder 17, the axial extension 115 on the piston passes through the opening 116 and depresses the trip bar 79, to permit the lever 106 to move to the left about its pivot due to the movement of the valve stem 86 as the check valve 85 is seated by the tension of spring 94. This action will take place if the operating valve B has been seated and the air vented from the cylinder 18. The seating of the check valve shuts off the supply of compressed air to the cylinder 17 and establishes communication between said cylinder and the outer atmosphere through the conduit 100, chamber 98, the ducts 87, the transverse passage 90a in the check valve stem and the lateral openings 90 in said stem. The release of the compressed air from the chamber 17 permits the spring 110 to move the clutch trip arm 14 back into clutch-engaging position, thereby preventing the tripping of the clutch until the piston 16 within the cylinder 17 is again moved downwardly. Such downward movement, however, is not rendered possible until both manually operable valves B are permitted to again seat, or, in other words, until the operator's hands are withdrawn from said valves and again applied thereto. This will be apparent, for when the operating valves B are opened in the manner specified, a puff or blast of air passes through the pneumatic circuit to act upon the piston in the pilot valve operating means, and after so acting, the incoming air pressure operates to move the plunger valve 47 of the cut-out valve C against the seat 54 and said valve will remain seated so long as the left hand operating valve B is held open. When the hand is removed from the left hand operating valve B the check valve 25 therein will seat under the force of the spring 26, the compressed air entrapped in the cut-out valve C will vent through the opening 40 in said valve and permit the plunger valve 47 to unseat. When the hand is removed from the right hand operating valve B, the air from the cylinder 18 will vent through the opening 40 in said valve, the piston 69 will be moved upwardly by spring 73, and the spring 81 will move the bell-crank lever 75 about its pivot and return the trip bar 79 to its normal position.

If either of the manually operable valves B is tied down or held down, further operation of the press will be precluded, because, as above described, if the left hand valve B is held down, the plunger valve 47 will remain seated and prevent the passage of air through the pneumatic circuit; while if the right hand valve B is held down, the back pressure from the pilot cylinder will act upon the floating valve 60 to seat the same, and as the effective area of the valve 60 acted upon by this back pressure is greater than the effective area of the seating face of the valve, it will be apparent that a puff of incoming air through the cut-out valve C will be insufficient to unseat the valve 60. Hence, if the right hand operating valve is tied down, the air will be trapped in the cylinder 18 and when the trip bar is depressed by the piston extension 115, the trip bar will move to the right below the lever 106 to hold the valve check 85 unseated, thus preventing the upward movement of clutch trip bar into clutch-engaging relation.

It will thus be seen that the safety device is effective to prevent press operation if any attempt is made by the press operator to have one of his hands free during the tripping of the press.

Should it be desired to use the press for strip or roll feed during which the hands of an operator need not be brought into proximity of the operating press head, while at the same time provide a guarded point of operation during the commencement of the press operation, or where the sheet stock to be acted upon by the press is of such size as to require handling by more than one operator, or by a single operator at some point other than in front of the press, it will be appreciated that after press adjustments have been made the press can be continuously operated by providing a direct connection of air pressure to the interior of the operating cylinder 17 whereby the clutch trip will be held free of the clutch.

The safety device hereinbefore described, it will be appreciated, is subject to modification in constructional features and also subject to various uses within the range of engineering skill, without departing from the spirit of the invention.

What I claim is:

1. Pneumatic safety control means for operation of a press or the like, comprising an air pressure responsive member, a pilot valve for controlling the admission to, and the venting from said pressure-responsive member of compressed air, and a pneumatic circuit having therein a cutout valve adapted to permit only a puff of compressed air to pass through the circuit, the pilot valve comprising a three-way valve having ducts adapted for communication with the pressure-responsive member, with a source of compressed air, and with the atmosphere, and a pilot operating mechanism responsive to a puff of compressed air from the pneumatic circuit to operate the three-way valve to admit compressed air from the source to the pressure-responsive member, and means on the pilot operating mechanism operable by the pressure-responsive member after it has been acted upon by the compressed air to operate the three-way valve to permit venting of the compressed air from the pressure-responsive member to the atmosphere.

2. Pressure safety control means for operation of a press or the like, comprising an air pressure responsive member, a pilot valve for controlling the supply of compressed air to said pressure-responsive member, and a pneumatic circuit having therein at least three valves in series, two of which are manually unseatable and the third is a cut-out valve disposed in the circuit between the two manually unseatable valves and is adapted to permit only a puff of compressed air to pass through the circuit when the manually unseatable valves are sequentially or simultaneously opened, and a pilot operating mechanism responsive to air pressure and operable by a puff of compressed air passing through the pneumatic circuit to open the pilot valve to admit compressed air from the supply source to the pressure-responsive member.

3. Pressure fluid control means for operation of a press or the like, comprising an air pressure responsive member, a pilot valve for controlling the admission to, and the venting from said pressure-responsive member of compressed air, and a pneumatic circuit having therein at least three valves in series, two of which are manually unseatable and the third is a cut-out valve disposed in the circuit between the two manually unseatable valves and is adapted to permit only a puff of compressed air to pass through the circuit when the manually unseatable valves are sequentially or simultaneously opened, the pilot valve comprising a three-way valve having ducts adapted for communication with a source of compressed air, with the pressure-responsive member and with the atmosphere, and a pilot operating mechanism responsive to a puff of compressed air from the pneumatic circuit to operate the three-way valve to admit compressed air from the source to the pressure-responsive member, and means on the pilot operating mechanism operable by the pressure-responsive member after it has been acted upon by the compressed air to operate the three-way valve to permit venting of the compressed air from the pressure-responsive member to the atmosphere.

4. Pneumatic safety control means according to claim 1, wherein the air pressure responsive member comprises a cylinder having a piston therein which is movable by compressed air; wherein the three-way valve is normally spring-seated to close the compressed air line and establish open communication between the interior of the cylinder and the atmosphere; and wherein the pilot operating mechanism includes a cylinder having a piston therein, a trip bar disposed between the pilot cylinder and the three-way valve and through which trip bar the three-way valve is unseated.

5. Pneumatic safety control means according to claim 1, wherein the air pressure responsive member comprises a cylinder having a piston therein which is movable by compressed air; wherein the three-way valve is normally spring-seated to close the compressed air line and establish open communication between the interior of the cylinder and the atmosphere; wherein the pilot operating mechanism includes a cylinder having a piston therein, a trip bar disposed between the pilot cylinder and the three-way valve and through which trip bar the three-way valve is unseated; and wherein the piston has means movable therewith for engaging and tripping the trip bar to permit the three-way valve to again seat and re-establish communication between the cylinder and the atmosphere.

6. In combination with a press or the like having a movable head, of pneumatic safety control means for operating said head, comprising an operating cylinder having a piston therein capable of causing movement of the movable head, a pilot valve for controlling the admission of compressed air to said cylinder to move the piston therein, and a pneumatic circuit having therein at least three valves in series, two of which are adapted to be separately manually unseated by the hands of an operator and are disposed at points well away from the danger zone of movement of the press head, and the third is a cut-out valve disposed in the circuit between the other two valves, and adapted to permit only a puff of compressed air to pass through the circuit, when the manually operable valve nearest the pilot valve is unseated in advance of, or simultaneously with the other manually operable valve, and a pilot operating mechanism comprising a pilot cylinder and a pilot movable therein which is responsive to a puff of compressed air from the pneumatic circuit to operate the pilot valve to admit compressed air from the supply source to the operating cylinder.

7. Pneumatic control means for operation of a power press or the like having a positive acting clutch on the power shaft thereof, comprising a clutch-operating cylinder having an opening through its bottom, a piston responsive to fluid pressure movable in said cylinder and having an extension adapted to extend through the opening in the bottom of the cylinder, means movable by the movement of the piston for tripping the clutch, and a spring-seated, three-way pilot valve having ducts adapted for communication with a source of compressed air, with the clutch operating cylinder, and with the atmosphere, a pilot operating mechanism responsive to compressed air to unseat the three-way valve to admit compressed air from the source to the clutch-operating cylinder, said pilot operating mechanism comprising a trip bar, which is adapted to be engaged by the extension on the piston after the latter has been moved by the compressed air entering the clutch-operating cylinder to permit seating of the three-way valve to establish communication between the interior of the clutch-operating cylinder and the atmosphere whereby to vent the compressed air from the clutch-operating cylinder.

8. Pneumatic safety control means, comprising a cylinder assembly unit consisting of a cylinder, a spring-biased piston movable within said cylinder under the influence of air pressure, said cylinder having an opening through its bottom and the piston having an extension adapted to extend through said opening, a three-way pilot valve having ducts adapted to alternately establish fluid communication between a source of compressed air and the interior of the cylinder, and between the interior of the cylinder and the atmosphere, fluid-responsive pilot operating means comprising a pivoted trip bar adapted for operating the pilot valve to establish fluid communication between the source of compressed air and the cylinder, and said trip bar being adapted to be tripped by the extension on the piston as it passes through the bottom of the cylinder for operating the pilot valve to establish fluid communication between the interior of the cylinder and the atmosphere.

9. Pressure safety control means for operation of a press or the like, comprising a cylinder assembly unit consisting of a cylinder, a spring-biased piston movable within said cylinder under the influence of air pressure, said cylinder having an opening through its bottom and the piston having an extension adapted to extend through said opening when the piston is moved by air pressure in opposition to the spring, a normally spring-seated pilot valve for controlling the supply of compressed air to said cylinder, a pilot operating mechanism responsive to air pressure comprising a pivoted trip bar adapted for unseating the pilot valve for admitting compressed air from the supply source to the cylinder, and further adapted to be tripped by the extension on the piston to permit the pilot valve to reseat.

SELDEN T. WILLIAMS.